Feb. 12, 1963 H. G. DE FRANCE 3,077,516

COLOR RECEIVER HAVING SEPARATE COLOR AND MONOCHROME DISPLAYS

Filed July 24, 1958 3 Sheets-Sheet 1

United States Patent Office 3,077,516

Patented Feb. 12, 1963

3,077,516

COLOR RECEIVER HAVING SEPARATE COLOR AND MONOCHROME DISPLAYS

Henri Georges de France, Paris, France, assignor to Compagnie Francaise de Television, a corporation of France Filed July 24, 1958, Ser. No. 750,622
Claims priority, application France July 26, 1957
4 Claims. (Cl. 178—5.4)

The present invention relates to compatible color television receivers, i.e. those capable of reproducing high grade color pictures and also, if desired, black and white pictures of a quality equivalent to those provided by conventional black and white television receivers.

It is an object of the present invention to provide a new compatible color television receiver of a more simple structure and of a lower manufacturing cost than those commonly used.

The video receiver according to the present invention comprises means for recreating the transmitted picture in color and distribution means, automatically controlled as a function of the type of the video informations received, for channelling these signals towards the black and white portion of the receiver when the transmitted signals are black and white and for channelling, upon reception of color information, the monochrome signals towards the color reproducing portion of the receiver and the video information fraction corresponding to the image pattern onto the black and white portion of the receiver, the resulting partial images being subsequently superimposed in any known manner.

According to the invention, the final colored picture is obtained by optically superimposing the black and white contour pattern of the picture and the colors of the picture which are provided by one picture or several pictures of different colors. The definitions of the partial color picture or pictures may then be low with respect to the definition used at the camera shooting or recording. It is thus possible to employ for recreating the colored picture a color picture tube of low definition, thus considerably simplifying the manufacture and substantially reducing the cost price.

The invention will be best understood from the following detailed description and appended drawings, wherein.

In all the figures, the same references designate the same elements.

Figure 1:
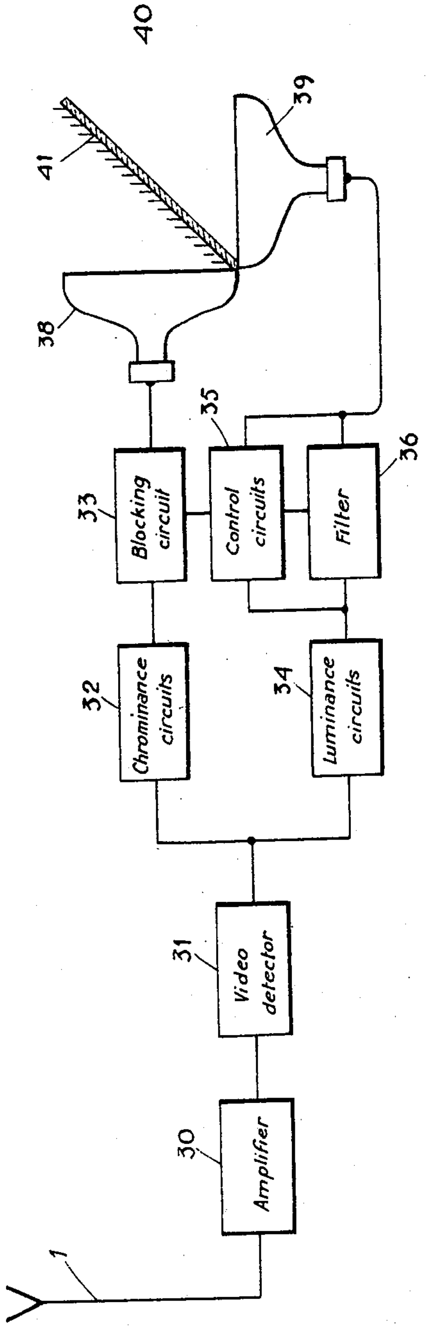
FIG. 1 is a block diagram of a video receiver according to the invention.

According to the embodiment illustrated in FIG. 1, the receiver comprises an aerial 1, high frequency amplification, frequency changer and intermediate frequency amplification circuits 30 and detection circuits 31. Two main video channels are provided, a color channel and a black and white channel. The color channel comprises, in addition to conventional chrominance circuits 32 which provide conventional red, green and blue elementary signals, a circuit 33 controlled by a circuit 35, comprised in the black and white channel and arranged for blocking the color channel, and picture reproducing means, for instance a three color picture tube. The black and white channel comprises a conventional black and white receiver circuit 34, a high pass filter 36, connected in parallel with control circuit 35, and a black and white picture tube 39. The superimposition of the pictures, respectively provided by tubes 38 and 39 being obtained for a person located at 40 by means of a translucid glass 41.

The above television receiver system operates as follows:

As is known, color television information comprises chrominance and luminance information. The luminance signals carry information regarding the brightness of the picture, whereas the chrominance signals carry information as to the color of the picture. This information is resolved into the three elementary colors, i.e. blue, green, and red, and results in combined signals which are modulated on a subcarrier in the upper portion of the transmission frequency band.

If the signal received by aerial 1 is a color television signal it comprises chrominance and luminance information, whereas, if the signal received is a black and white signal, the chrominance is absent. The information received by aerial 11 is fed to both channels. The chrominance channel operates on the chrominance signals and circuit 32 delivers to the electron guns of tube 38 the corresponding monochrome red, blue or green signals.

In the black and white channel a high-pass filter 36 eliminates the low frequencly information portion of the luminance information and passes to tube 39 only the luminance information corresponding to the high frequency portion of the band.

Thus, when color signals are received, tube 38 provides the colors and tube 39 the contours separating the various elements of the picture. The respective pictures provided by tubes 38 and 39 are superimposed on semi translucid screen 41.

If the signal received is a black and white signal, only the luminance information is present. The whole of the information both in the lower frequency and the higher frequency portions of the band, are then fed through circuit 35 to picture tube 39 and the absence of chrominance information results in the blocking of circuit 33, such that tube 38 receives no signal at all.

The three-color tubes 38 and 39 are entirely conventional. However, and this is a particular advantage provided by the invention, tube 38 need not have a fine definition and, while manufactured in a conventional manner, may have a smaller number of dot clusters and a masking plate with less holes.

Alternately, three monochrome picture tubes can be used, their respective pictures being transmitted to the viewer by means of any suitable optical device whose arrangement is not a problem for those skilled in the art.

Figure 2:
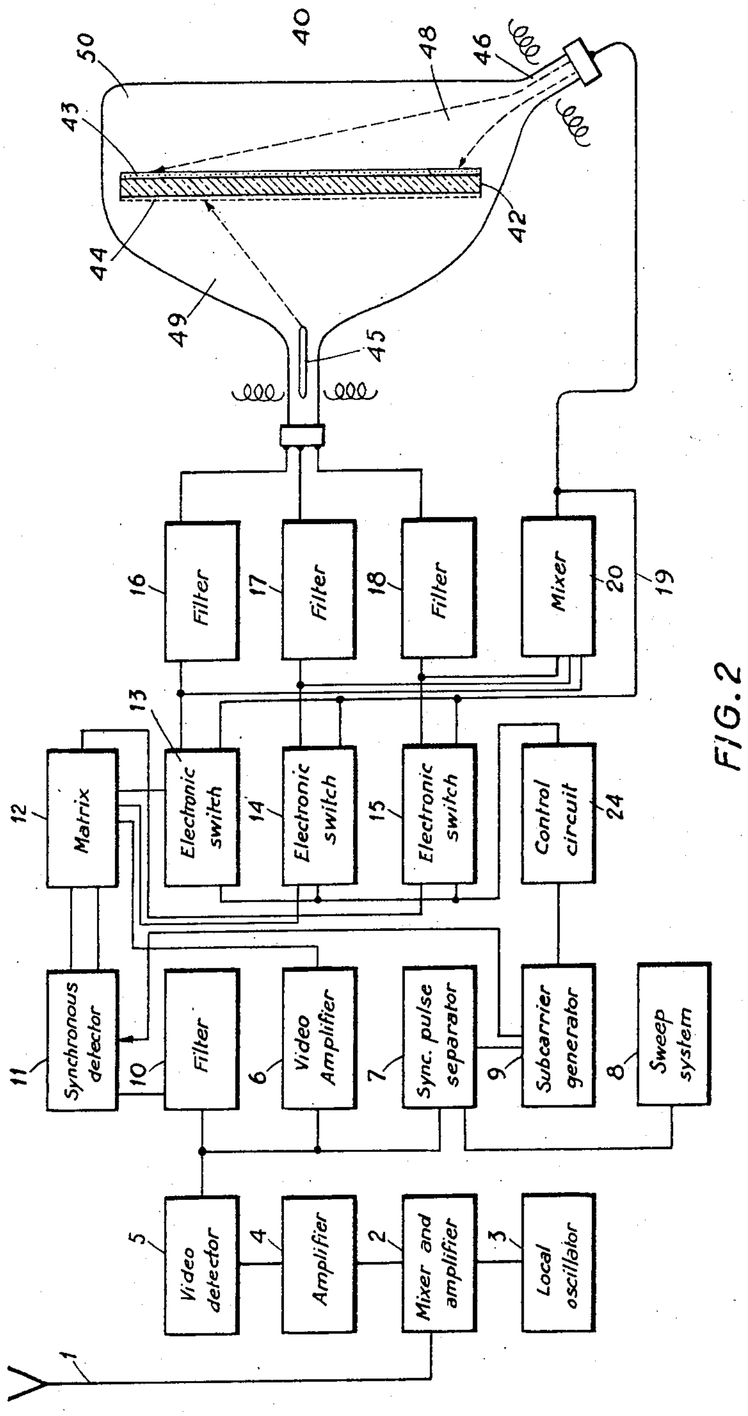
FIG. 2 shows a more elaborate embodiment of the receiver according to the invention.

FIG. 2 shows a more elaborate embodiment of a compatible television according to the invention. Aerial 1 feeds a high frequency amplifier and mixer stage 2, which also receives the signal from a local oscillator 3 and furnishes an amplified intermediate frequency signal. The signal is amplified in an amplifier 4 and detected in a detector 5 which provides the video signal. The nature and the arrangement of the video circuits depend on the type of transmission employed. It will be assumed, by way of example, that the signal is transmitted according to the N.T.S.C. standards. In such a system, a subcarrier wave, selected in the upper portion of the video frequency band, is modulated by two combination signals, resulting from a combination of monochrome information, usually referred to as $E_Q$ and $E_I$ signals, the luminance information being transmitted throughout the whole of the video frequency band. In order for the transmitted signals to be detected, it is necessary to effect a synchronous detection from a subcarrier restored in the receiver. This subcarrier restoration is controlled by an additional burst of a few cycles of the subcarrier frequency which are transmitted for example during the line blanking signals. The video signal derived from video detector 5 is also fed to a video amplifier 6 which provides luminance information which was transmitted as a combination of the three monochrome information signals in substantially the whole of the video channel and which is usually referred to as the $E_Y$ signal. Detector 5 also feeds a sync pulse separator circuit 7, which feeds to all the scanning circuits 8 the line and frame synchronizing signals, and the subcarrier restoration circuit 9. The information fraction corresponding to the product of the subcarrier modulation is passed through a filter 10, to a sync detector 11 which also receives the restored subcarrier. Detector 11 provides the chrominance information which is fed, together with the luminance information, to a matrix 12 effecting the additions and subtractions necessary for the restoration of the three elementary monochrome signals, red, green, and blue.

According to the invention, electronic switches or gates 13, 14, 15 are inserted in the red, green and blue channels, respectively, to direct the monochrome signals either onto low-pass filters 16, 17 and 18, or onto a common output 19. Electronic switches 13, 14 and 15 are, for example, of the type described in "Waveforms," vol. 19, of the Radiation Laboratory Series, of the Massachusetts Institute of Technology, fig. 3–12 on page 49 in the case of diodes and fig. 10–17, on page 380 in the case of pentodes. The signal passed by these filters is applied to the color pattern 49 of a cathode tube 50, having in addition a portion 48 for black and white pictures. To this end picture tube 50 comprises a glass screen 42 whose two faces are arranged to provide screens for color and black and white pictures respectively, the coating of face 43 being translucid. Tube portion 49 may comprise one or several electron guns 45. The "black and white" portion 48 comprises a single, laterally located, electron gun 46, one electrode of which is connected to the common output 19. According as the information received is color or black and white information, one or both tube portions 49 or 48 are used. A viewer placed at 40 observes then a color image or a black and white image as the case may be.

The signal rejected by the low-pass filters 16, 17 and 18 feed a mixer circuit 20. Circuit 20, which corresponds to the input circuit of the mixed highs, may effect a certain transformation of the signals applied thereto for instance, a derivation or a shaping enabling a sharp layout of the contours to be obtained. The outputs of circuits 19 and 20 are connected in parallel to the black and white region 48 of the tube 50.

If a single tricolor tube is used, signals passed by low-pass filters 16, 17 and 18 feed directly tube 49 which is equipped with three simultaneously modulated electron guns.

If three monochromatic tubes are used, the respective outputs of the low-pass filters 16, 17 and 18 feed directly the modulation electrodes of the three tubes.

Switches 13, 14 and 15 are controlled in parallel by a control circuit which receives the subcarrier signal restored at 9. The control circuit 24 is, for example, of the type known in the art under the name of "color killer" (see for example "Principles of Color Television," by Haseltine Staff, John Wiley and Sons, 1956, page 194). When such a subcarrier is present, the switches are set to feed low-pass filters 16, 17 and 18. In the absence of the subcarrier, the video signal provided by matrix 12 is fed through circuit 19 to tube 21.

Alternatively circuit 24 may directly control the biasing voltage of the color tube or tubes. It will be apparent that in the illustrated block diagram, the amplifier and coupling stages have been omitted for the sake of simplicity.

Figure 3:
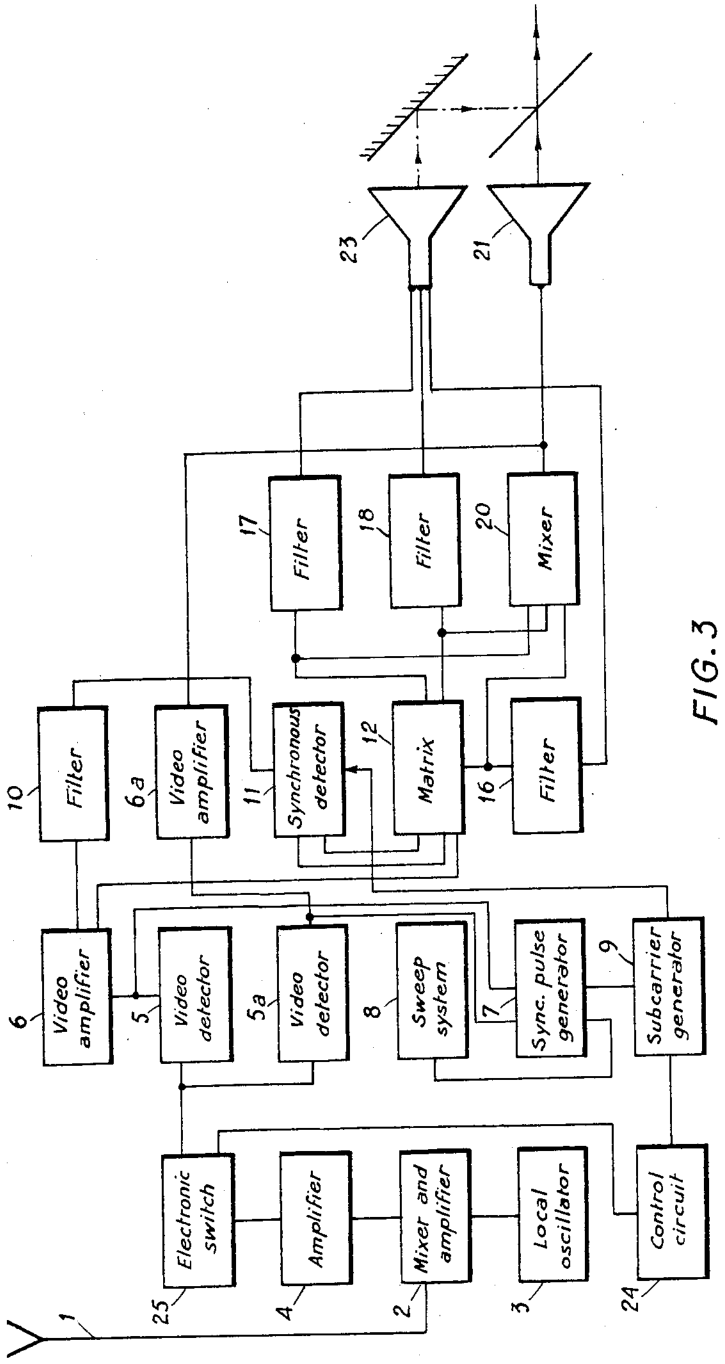
FIG. 3 is a further embodiment of the receiver.

In the alternative embodiment shown in FIG. 3 control circuit 24 may operate on the intermediate frequency signal. Under these conditions, control circuit 24 controls a two-output switch 25 fed from the intermediary frequency amplifier 4. In the absence of subcarrier, the signal feeds a video detector **5*a* and an amplifier 6*a*, the output signal of which is applied to a picture tube 21. When the subcarrier is present the signal is applied to video detector 5 feeding circuits 6 and 10, as previously described. The output signals of filters 16, 17 and 18 is fed to picture tube 23. The remainder of the circuit is similar to that of FIG. 2. The electronic switch 25 and the control circuit 24** may be respectively of the type indicated in connection with the description of FIG. 2.

Of course many variations of the arrangements according to the invention are within the ambit of those skilled in the art and may be modified without departing from the spirit of the invention.

What is claimed is:

1. A compatible television receiver for receiving black and white television signals and color television signals comprising chrominance information modulating a subcarrier wave, said receiver comprising: color picture reproducing means; black and white picture reproducing means; optical means for combining the images respectively provided by said picture reproducing means; a first channel for said color picture reproducing means; a second channel for said black and white picture reproducing means; means for deriving from said black and white signals a relatively wide-band luminance signal; means for blocking said first channel; means for applying said wide-band luminance signal to said second channel; means for deriving from said color television signals a signal at said subcarrier frequency, color video signals and a realtively narrow-band luminance signal; means for deriving from said signal at said subcarrier frequency a control signal; switching means common to both said channels for unblocking said first channel and applying said color video signals to said first channel, and for applying said relatively narrow-band luminance signal to said second channel, said switching means having a control input; and means for applying said control signal to said control input.

2. A compatible television receiver for receiving black and white television signals and color television signals comprising chrominance information modulating a subcarrier wave, said receiver comprising: color picture reproducing means; black and white picture reproducing means; optical means for combining the images respectively provided by said picture reproducing means; means for deriving a luminance video signal from those of said television signals which are being received; means for deriving chorminance signals and a signal at said subcarrier frequency from said color signals; means having an output for deriving a control signal from said signal at subcarrier frequency; a matrix having a plurality of outputs; means for feeding said luminance video signal and said chrominance signals to said matrix; a plurality of switching means having respective signal inputs connected respectively to said matrix outputs, respective control inputs connected to said output of said means for deriving a control signal, and respective first and second outputs, each of said switching means being responsive to said control signal to connect selectively its input to its first and second output; a plurality of frequency selecting means, connected in series respectively with said first output of each of said switching means, for separating higher and lower video frequencies; means for feeding said lower frequencies to said color picture reproducing means; a circuit for combining said higher video frequencies into a narrow band luminance signal, said combining circuit having a pluraltiy of inputs and one output; means for feeding said higher frequencies to said combining circuit inputs, said combining circuit output feeding said black and white picture reproducing means; and means for connecting the second outputs of said switching means to said black and white picture reproducing means.

3. A compatible television receiver for receiving black and white television signals and color television signals comprising chrominance information modulating a subcarrier wave, said receiver comprising: color picture reproducing means; black and white picture reproducing means; optical means for combining the images respectively provided by said picture reproducing means; a high frequency stage; an intermediate frequency stage having one output for supplying intermediate frequency signals corresponding respectively to said black and white signals and to said color signals; means including a first video detector for deriving a first luminance video signal from said intermediate frequency signals corresponding to said black and white signals; means including a second video detector for deriving a second luminance video signal and chrominance signals from said intermediate frequency signals corresponding to said color television signals; means coupled to said first detector and second detector for deriving a signal at said subcarrier frequency from said intermedaite frequency signals corresponding to said color signals; means having an output for deriving a control signal from said signal at subcarrier frequency; a matrix having a plurality of outputs; means for feeding said second luminance video signal and said chrominance signals to said matrix; a plurality of frequency selecting means connected in series respectively with said outputs of said matrix for separating higher and lower video frequencies; means for feeding said lower video frequencies to said color picture reproducing means; a circuit for combining said higher video frequencies into a narrow band luminance signal, said combining circuit having a plurality of inputs and one output; means for feeding said higher video frequencies to said combining circuit inputs, said combining circuit output feeding said black and white picture reproducing means; switching means having a signal input connected to said output of said intermediate frequency stage, a control input connected to said output of said means for deriving a control signal and first and second outputs, said switching means being responsive to said control signal to connect selectively its input to its first and second output, said first output and second output of said switching means being respectively connected to said first and second video detector.

4. A compatible television receiver for receiving black and white television signals and color television signals comprising chrominance information modulating a subcarrier wave, said receiver comprising: color picture reproducing means; black and white picture reproducing means; optical means for combining the images respectively provided by said picture reproducing means; a first channel for feeding said color picture reproducing means; a second channel for feeding said black and white picture reproducing means; means for deriving from said black and white signals a relatively wide-band luminance signal; means for blocking said first channel; means for applying said wideband luminance signal to said second channel; means for deriving from said color television signals a signal at said subcarrier frequency and a plurality of color video signals; means for deriving from said signal at said subcarrier frequency a control signal; respective filtering means for separating the higher and lower video frequencies of each of said color video signals; a circuit for combining said higher video frequencies of each of said color video signals into a narrow band luminance signal; switching means, having a control input, for unblocking said first channel and applying said lower video frequencies to said first channel, and for applying said narrow band luminance signal to said second channel; and means for applying said control signal to said control input.

References Cited in the file of this patent

UNITED STATES PATENTS

| | | |
|---|---|---|
| 2,573,777 | Szilklai | Nov. 6, 1951 |
| 2,681,379 | Schroeder et al. | June 15, 1954 |
| 2,688,048 | Rose | Aug. 31, 1954 |
| 2,839,599 | Epstein | June 17, 1958 |
| 2,846,499 | Heuer et al. | Aug. 5, 1958 |
| 2,885,464 | Loughlin | May 5, 1959 |
| 2,905,751 | Ralston | Sept. 22, 1959 |